March 30, 1948.  L. L. WARTES  2,438,834
HEAT STORING HOT AIR CIRCULATING APPARATUS
Filed Dec. 14, 1944  3 Sheets-Sheet 1

LLOYD L. WARTES
INVENTOR.

BY
Attorney

March 30, 1948. L. L. WARTES 2,438,834
HEAT STORING HOT AIR CIRCULATING APPARATUS
Filed Dec. 14, 1944 3 Sheets-Sheet 2

LLOYD L. WARTES
INVENTOR.

BY
Attorney

LLOYD L. WARTES
INVENTOR.

Patented Mar. 30, 1948

2,438,834

UNITED STATES PATENT OFFICE 2,438,834

HEAT STORING HOT-AIR CIRCULATING APPARATUS

Lloyd L. Wartes, Opportunity, Wash.

Application December 14, 1944, Serial No. 568,163

7 Claims. (Cl. 219—38)

The present invention relates to heating apparatus and more particularly to heating apparatus which is adapted for utilization of off-peak electrical energy.

It is a primary object of the present invention to provide a heating apparatus comprising a relatively simple, low cost heat storage reservoir within which heat may be accumulated through dissipation of electrical energy therein during off-peak load periods, such as during the night and early morning hours, and which heat may be utilized as required during other periods of the day. Such heating apparatus as has been designed heretofore for utilization of off-peak electrical energy has certain disadvantages such as high initial cost, high maintenance cost or low efficiency. It is a further object of the present invention to overcome these defects and disadvantages of the prior art structures.

A further object of the invention is to provide a new and improved heating apparatus of the type described in which the heat storage reservoir serves also as the heat exchanger when heating is required.

A still further object of the invention is to provide a new and improved heating apparatus of the type described of the circulating air type in which loss of heat when heating is not required is substantially prevented.

These and further objects of the invention will be pointed out in the following description taken in connection with the accompanying drawings while the features of novelty will be set forth with greater particularity in the appended claims.

Figure 2:
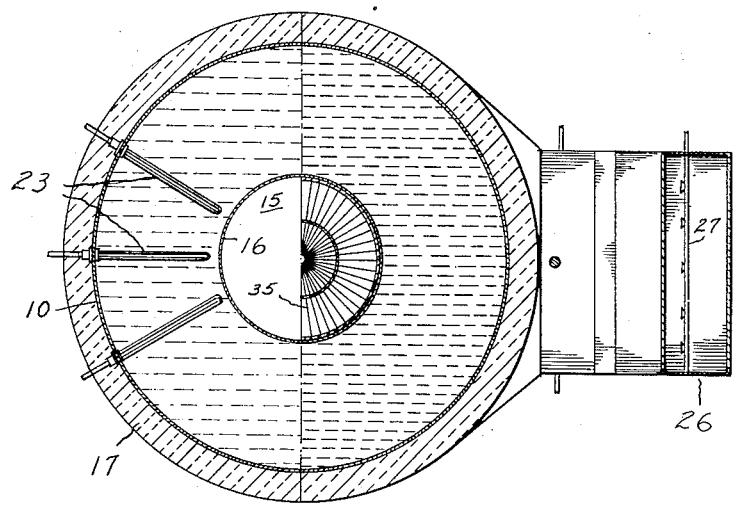
Figure 1:
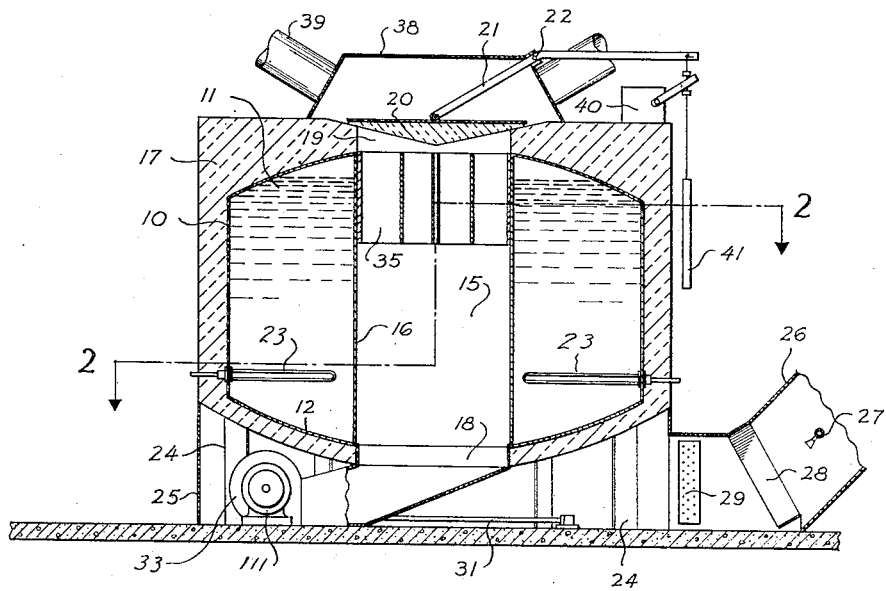
Figure 4:
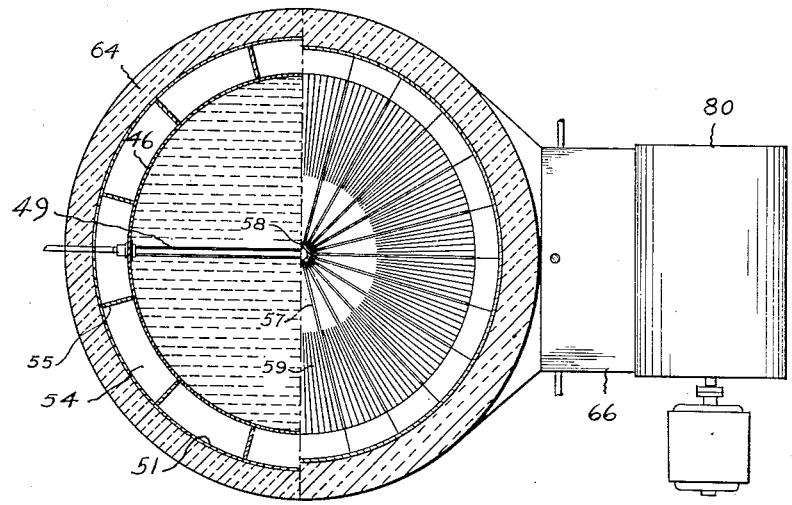
Figure 3:
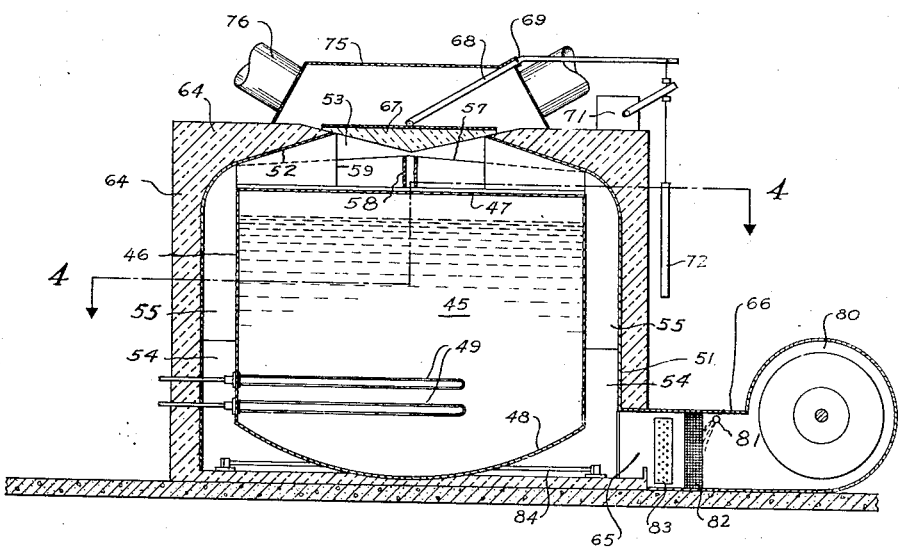
Figure 5:
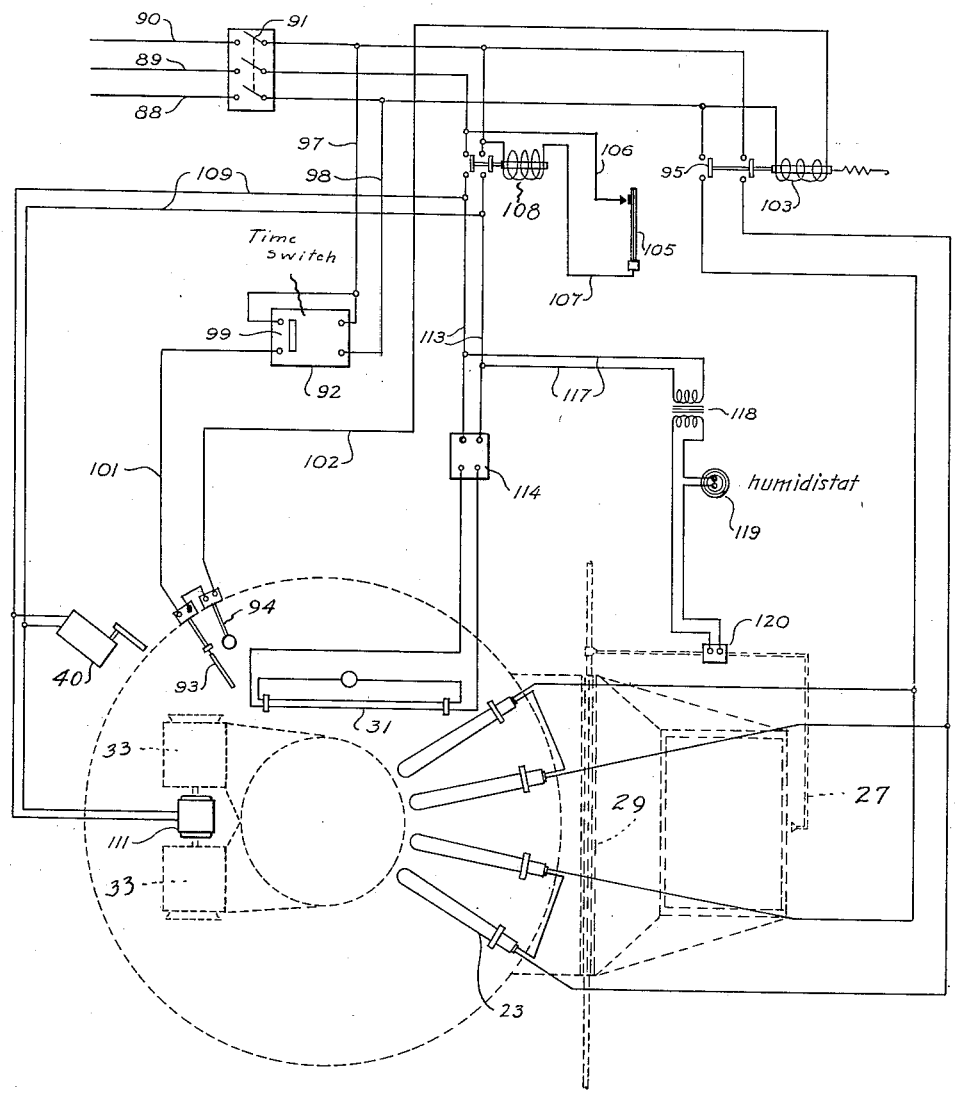

In the drawings Fig. 1 is a sectional elevation through a heating apparatus constructed in accordance with one modification of the invention; Fig. 2 is a cross-sectional view taken along the line 2—2 of Fig. 1; Fig. 3 is a sectional elevation of a heating apparatus constructed in accordance with a second modification of the invention; Fig. 4 is a cross-sectional view taken along the line 4—4 of Fig. 3, and Fig. 5 is a schematic wiring diagram illustrating the control system for the heating apparatus of the invention.

Referring now particularly to the modification illustrated in Figs. 1 and 2 the heating apparatus therein shown comprises a relatively large tank having an outer wall 10 and upper and lower walls 11 and 12, respectively, which tank is adapted for containing a relatively large volume of water or other suitable heat storage liquid. An air passageway 15 is provided through the tank and which, in this particular modification, is illustrated as being defined by the cylindrical wall 16 extending vertically through the center of the tank. The tank is surrounded by a relatively thick heat insulating enclosure 17, an inlet 18 being provided therethrough at the lower end of the passageway 15 and an outlet 19 therethrough at the upper end of the passage 15. A heat insulated closure member or damper 20 is provided for the outlet 19, the member 20 being supported upon the end of a lever 21 pivoted as at 22 and by means of which the member 20 may be moved between open and closed positions.

A plurality of electric immersion heater units 23 are mounted in the lower portion of the tank and having suitable terminals brought out through the heat insulating enclosure for connection with a source of current supply.

The tank 10 is supported upon a plurality of legs 24 resting upon the floor, the space beneath the tank being enclosed by a shell 25. Air is adapted to be supplied through the duct 26 to the space within the shell 25 beneath the tank 10 and, while not necessary to the practice of the present invention it may be desirable to provide a humidifying or spray jet 27, a filter unit 28 and a condenser unit 29 within the duct portion immediately adjacent the base of the structure. As a further refinement germicidal lamps such as indicated at 31 may also be conveniently mounted within the space beneath the tank. Suitable blower means as indicated at 33 are provided within the shell 25 for forcing air upwardly through the passage 15.

A heat transfer fin unit 35 is provided in the upper end of the passage 15 and which, as illustrated more clearly in the right hand portion of the view of Fig. 2 comprises a plurality of radially extending sheets which at their outermost edges are mounted in a thermally conductive relation to the wall 16. The air passing upwardly through the passage 15 will be preliminarily heated from cylindrical wall 16 and finally by the fin unit 35. Mounted upon the upper end of the enclosure 17 above the outlet 19 is an air distribution chamber 38 to which may be connected the various ducts 39 for conveying the heated air to the various rooms of the building.

The closure member 20 is relatively heavily insulated so that in the closed position thereof there will be a minimum of heat loss therethrough. By virtue of the fact that the closure member 20 in the closed position positively precludes circulation of air through the passage 15 there will be a minimum of heat lost from the heat storage reservoir during such periods of time as when heating is not required or when heat is being stored in the heat storage liquid. In the operation of the heating apparatus, which will be more fully described hereinafter, the closure member 20 will be maintained closed at all times when the driving motor for the blower 33 is de-energized. Thus when the room thermostat is in the off position there will be no loss of heat from the storage reservoir except that through the heat insulating enclosure 17 which may readily be kept at a minimum by suitable selection of the insulating material and quantity or thickness thereof. The closure member 20 may be controlled by a regulating motor device 40, a counter weight 41 being provided for balancing the weight of the member 20 and lessening the load on the device 40.

In the modification previously described an air passageway is provided through the center of the heat storage reservoir or tank and while such a construction facilitates the application of the heat insulating enclosure around the outer surface of the tank and also provides an efficient heat transfer surface, it may be desirable in certain instances by reason of manufacturing expediency or otherwise to provide the air passageway for heat exchange purposes entirely around the exterior of the tank. In the further modification of the invention illustrated in Figs. 3 and 4 the heat exchange passageways are so arranged.

Referring now to the modification illustrated in Figs. 3 and 4 a tank indicated generally at 45 is shown comprising an outer cylindrical shell 46, a top wall 47 and a bottom wall 48. The tank 45 is adapted for containing a suitable heat storage liquid such as water. Mounted within the lower portion of the tank are a plurality of electric immersion heater units 49 which are particularly adapted to be energized during predetermined off-peak periods.

Surrounding the tank 45 is an outer shell 51 which is spaced substantially uniformly from the cylindrical tank wall 46 defining an air passageway 54 therebetween, while the upper portion 52 of the shell slopes upwardly and converges toward a central opening 53. A plurality of radially arranged fins 55 extend between the tank wall 46 and the outer shell 51, the inner edges of the fins 55 being secured, such as by tack welding, to the wall 46 in a good thermal conductive relation. Extending across the top wall 47 of the tank are a plurality of relatively long fins 57 which extend from the outermost edge of the tank 45 to the center thereof, the inner ends of the fins 57 being secured as by welding to a hub member 58. Arranged between the outer ends of the fins 57 are a plurality of relatively short fins 59 which extend between the top 47 of the tank and the upwardly sloping end portion 52 of the outer shell, the inner ends of the fins 59 terminating substantially at the edge of the opening 53. Both the fins 57 and 59 are secured in a good thermally conductive relation with respect to the top wall 47. In the case of a flat upper end wall for the tank 45, as shown, the group of relatively long fins 57 extending all the way across the top of the tank may be relatively heavy so as to serve as a strengthening unit to prevent upward bulging of the tank wall 47 under pressures occurring within the tank. The outer shell 51—52 being supported at frequent intervals by the outer edges of the fins 55 within the side passage 54 and by the edges of the fins 59 in the upper passage 56, it may be made of relatively light weight sheet metal. Surrounding the shell 51—52 is a relatively thick enclosure 64 of a suitable heat insulating material in order substantially to prevent loss of heat from the enclosed reservoir. An inlet opening 65 is provided through the heat insulating enclosure 64 communicating with the lower end of the side passage 54 around the bottom of the shell 51 and to which inlet may be connected an air duct such as 66. An outlet opening is also provided through the heat insulating enclosure communicating with the opening 53 in the shell roof 52 and with the air passage above the tank 45. The outlet opening is adapted to be closed by a relatively heavily insulated closure member or damper 67 which closure member is hingedly connected to the end of a lever arm 68 pivoted as at 69 and connected for control by a suitable regulating device 71. A counterweight 72 is also connected to the outer end of the arm 68 whereby the closure member 67 may be adjusted more readily between the open and closed positions by the device 71. A hood 75 surrounds the outlet of the air passageway in a suitably spaced relation above the closure member 67 and to which may be connected the various hot air distribution ducts 76.

The cold air may be returned to the heating apparatus by means of a suitable motor driven blower indicated at 80 connected to the inlet duct 66. If desired a humidifying spray 81, an air filter 82 and a condenser unit 83 may be arranged within the duct section 66 outside of the shell 51. Germicidal lamps 84 may be arranged within the space around the bottom of the side passage 54.

As in the case of the previously described modification the driving motor for the blower 80 is interconnected with the control means for the operating device 71 for the passage closure member 67 so that the opening 53 above the reservoir 45 will be sealed shut at all times when the blower is not in operation and to prevent escape of heat during such periods of time as when heating is not required.

Referring now to the schematic diagram of Fig. 5 the electrical control system for the heating apparatus of either modification will now be described. The apparatus is adapted to be energized from a suitable source of supply indicated by the conductors 88, 89 and 90, through the master control switch 91. The energization of the immersion heater units 23 is controlled through a suitable time switch 92, temperature responsive device 93, pressure responsive device 94 and the contactor 95. The time switch 92 is connected for energization through conductors 97 and 98 to the supply conductors 88 and 90, the time switch being provided with control contacts indicated at 99, one of the contacts being shown connected to the conductor 97. The time switch may be adjusted so that the control contacts 99 are moved to the closed position during predetermined off-peak hours such as from midnight to five a. m., and upon closure thereof completes an energizing circuit through the conductor 101, through the closed contacts of the water temperature responsive device 93, the closed contacts of the tank pressure responsive device 94, the conductor 102, the winding 103 of the contactor 95 to the supply line 88. Upon the energization of the coil 103, the contactor 95 is moved to the closed position whereupon the immersion heater units 23 are connected to the source of supply. Upon either a rise in temperature of the water to the upper limit condition or rise in tank pressure to the upper limit condition or at the end of the operative period as determined by the setting of the time switch 92 the energizing circuit for the winding 103 will be disrupted causing opening of the contactor 95 and disconnection of the heater units 23.

A suitable thermostat device 105 may be provided within the enclosure, or room, to be supplied with heat from the storage reservoir and which thermostat may be provided with contacts, one of which may be connected by conductor 106 to the supply line 89 and the other through conductor 107 to the control winding of an electromagnetic switch 108 and from there to the supply line 90. Upon closure of the thermostat contacts and energization of the winding of switch 108 an energizing circuit is established through the conductors 109 to the motor device 40 provided for operating the closure member 20 for the air passage 15. The device 40 may be so arranged that upon energization thereof the closure member 20, will be opened and upon the de-energization thereof, the member 20 will be restored to the closed position. The driving motor 111 connected to the blowers 33 is also connected for energization from the conductors 109 simultaneously with the device 40. It will be obvious, therefore, that whenever the blowers 33 are operated the air passage 15 through the heat storage unit is opened and, conversely, when the operation of the blowers is discontinued the air passage is immediately closed to prevent loss of heat from the heat storage reservoir.

Upon the closure of the contacts of the switch 108 an energizing circuit is also established through the conductors 113 through the ballast device 114 for the germicidal lamps 31. The water supply to the condenser 29 and humidifier spray jets 27 may be arranged for control by the humidostat 119 and electromagnetically controlled valve 120 which is adapted to be energized through the transformers 118 and conductors 117.

In the description of the control system as given with particular reference to the modification of Figs. 1 and 2, it will be apparent that the same control system is equally applicable to the other modification of the heating apparatus as shown in Figs. 3 and 4.

While the invention is not necessarily so limited, it is preferred that the heat storage reservoirs be capable of operation at relatively high pressures, that is, of the order of 130 lbs. to take advantage of the inherently greater B. t. u. storage capacity of the water at such pressures. The tanks may readily be made to withstand such normal operating pressures while suitable safety devices may be provided for preventing excessive increase above a pre-determined maximum pressure. A suitable safety valve (not shown) may also be provided as a further precautionary measure. Particular attention is directed to the fact that the volume of water is sealed within the storage tank, and since there are no connections to the tank, whatever, for circulation of the water therefrom, there can be no loss of water and hence it should never be necessary to add any make-up water except following operation of the emergency blow off valve. For initially filling the tank, and for draining the same, as for servicing, suitable pipe connections may be made thereto as may be required.

Having described the principle of the invention in what is considered to be preferred embodiments thereof, it is desired that it be understood that the specific details shown are merely illustrative and that the invention may be carried out by other means.

I claim:

1. A heating apparatus comprising a reservoir containing a heat exchange liquid, an electric heating element immersed in the liquid in said reservoir, means including wall portions of said reservoir defining an air duct, a plurality of fins arranged in a heat exchanging relation with respect to the liquid in said reservoir and extending into said duct, a heat insulating enclosure for said reservoir and said duct, an air inlet to said duct, an outlet for said duct, a hood surrounding said outlet, air distribution pipes connected to said hood, blower means for forcing air through said duct, heat insulated closure means for said duct outlet for precluding flow of air therefrom, means for opening said closure means, control means for said blower and said closure means whereby said blower is turned on simultaneously with the opening of said closure means and vice versa.

2. A heating apparatus comprising a reservoir for containing a quantity of heat exchange fluid, a plurality of electric heating elements immersed in the fluid within said reservoir, an air duct, a plurality of fins arranged in a heat conductive relation with respect to the fluid in said reservoir extending transversely of said duct, a heat insulating enclosure for said reservoir and said duct, an air inlet through said enclosure to said duct, an air outlet through said enclosure from said duct, a hood surrounding said outlet, air distribution pipes connected to said hood, and a heat insulated closure member for said outlet and means for shifting said closure member between open and closed positions.

3. A heating apparatus comprising a tank for containing water, electric immersion heater units mounted in the lower portion of said tank, means including wall portions of said tank defining an air passageway, said wall portions serving to transfer heat from said water to air flowing through said passageway, a heat insulating enclosure for said tank and said passageway, an inlet through said enclosure for said passageway, an outlet through said enclosure for said passageway, a hood surrounding said outlet, air distribution pipes communicating with said hood, and an adjustable heat insulated closure member for said outlet.

4. A heating apparatus comprising a tank for containing water, electric immersion heater units mounted in the lower portion of said tank, a relatively large air passageway extending vertically through said tank, a heat insulating enclosure means for said tank, an inlet through said enclosure means to said passageway, an outlet through said enclosure means for said passageway, a heat insulated closure member for said outlet, said member in the closed position resting upon the edge portion of said enclosure means defining said outlet, means connected to said member for lifting said member vertically away from said outlet to an open position, a hood surrounding said outlet and said member, and air distribution pipes connected to said hood.

5. A heating apparatus comprising a tank for containing water, electric immersion heater units mounted in the lower portion of said tank, a relatively large cylindrical passageway extending vertically through the center of said tank, a heat insulating enclosure for said tank, an inlet through said enclosure to said passageway, an outlet through said enclosure for said passageway, an adjustable heat insulated closure member for said outlet, a hood surrounding said outlet and said member, and means extending into said hood and connected to said member for lifting said member away from said outlet.

6. A heating apparatus comprising a tank for containing water, electric immersion heater units mounted in the lower portion of said tank, a heat insulating enclosure surrounding said tank in a spaced relation with respect thereto, an inlet for introducing air into the lower portion of the space between said tank and said enclosure, an outlet communicating with said space at the upper end of said enclosure, heat exchanging fins secured to the walls of said tank and extending across said space providing heat transfer surfaces, a closure member for the upper end of said space for precluding passage of air therethrough, means for adjusting said closure member between open and closed positions, a hood surrounding said member on the outside of said enclosure and spaced from said member so as to permit opening and closing movements thereof, and air distribution pipes communicating with said hood.

7. A heating apparatus comprising a tank for containing water or the like heat exchange fluid, electric immersion heater units mounted in the lower portion of said tank, a heat insulating enclosure surrounding the sides and top of said tank, a passage between the side wall of said tank and said enclosure, the upper portion of said enclosure being spaced from the top of said tank, a plurality of radially arranged plates extending upwardly from the top of said tank across the space between said tank and the upper portion of said enclosure, said passageway along the side of said tank communicating with said space at the top of said tank, an opening through the upper portion of said enclosure communicating with said space above said tank, an adjustable heat insulated closure member for said opening, a hood mounted on the upper portion of said enclosure around said opening and over said member, and air distribution pipes communicating with said hood.

LLOYD L. WARTES.

REFERENCES CITED

The following references are of record in the file of this patent:

UNITED STATES PATENTS

| Number | Name | Date |
|---|---|---|
| 1,708,580 | Kerlaouezo et al. | Apr. 9, 1929 |
| 1,753,190 | Andrews | Apr. 8, 1930 |
| 2,166,509 | Smith | July 18, 1939 |
| 2,238,624 | Clark | Apr. 15, 1941 |
| 2,290,402 | Witte | July 21, 1942 |
| 2,305,551 | Novak | Dec. 15, 1942 |

OTHER REFERENCES

Dana et al., "Bulletin No. 46," State College of Washington, Pullman, Washington, July 1935.